United States Patent
Luengo Hendriks

(10) Patent No.: US 11,449,972 B2
(45) Date of Patent: Sep. 20, 2022

(54) METHOD FOR ALIGNING DIGITAL IMAGES OF TISSUE SECTIONS USING TISSUE OBJECT CORRESPONDENCES

(71) Applicant: Flagship Biosciences, Inc., Westminster, CO (US)

(72) Inventor: Cris L. Luengo Hendriks, Broomfield, CO (US)

(73) Assignee: Flagship Biosciences, Inc, Westminster, CO (US)

(*) Notice: Subject to any disclaimer, the term of this patent is extended or adjusted under 35 U.S.C. 154(b) by 0 days.

(21) Appl. No.: 16/601,296

(22) Filed: Oct. 14, 2019

(65) Prior Publication Data

US 2021/0110519 A1 Apr. 15, 2021

(51) Int. Cl.

| | |
|---|---|
| *G06T 5/50* | (2006.01) |
| *G06T 7/00* | (2017.01) |
| *G06T 7/73* | (2017.01) |
| *G06K 9/62* | (2022.01) |
| *G06V 20/69* | (2022.01) |

(Continued)

(52) U.S. Cl.
CPC ............ *G06T 5/50* (2013.01); *G06K 9/6201* (2013.01); *G06K 9/6215* (2013.01); *G06T 7/0012* (2013.01); *G06T 7/33* (2017.01); *G06T 7/55* (2017.01); *G06T 7/73* (2017.01); *G06V 20/69* (2022.01); *G06T 2207/10056* (2013.01);

(Continued)

(58) Field of Classification Search
CPC ........... G06T 5/50; G06T 7/0012; G06T 7/55; G06T 7/73; G06T 2207/20221; G06T 2207/30024; G06T 2207/10024; G06T 7/33; G06T 2207/10056; G06K 9/6201; G06K 9/6215; G06V 20/69

See application file for complete search history.

(56) References Cited

U.S. PATENT DOCUMENTS

| | | | | |
|---|---|---|---|---|
| 2010/0290692 | A1* | 11/2010 | Macaulay | ............ G06T 7/0012 382/133 |
| 2014/0169654 | A1* | 6/2014 | Athelogou | ............ G06T 7/0012 382/133 |

(Continued)

OTHER PUBLICATIONS

Á Parra, T.-J. Chin, F. Neumann, T. Friedrich, and M. Kalzmann, "A practical maximum clique algorithm for matching with pairwise constraints", arXiv:1902.01534, 2019.

(Continued)

*Primary Examiner* — Jon Chang

(57) ABSTRACT

The present invention concerns identifying matching tissue objects in two sections of a tissue block, as imaged using a microscope, for the purpose of mapping the biomarker-specific staining in one section onto the other section. The invention is useful because, in many workflows, it is not possible to add a sufficient number of different biomarker-specific stains to a single slide. By staining instead multiple slides, and mapping the staining data obtained across the slides, one obtains a data set that is similar to what one would be able to obtain by staining a single slide with all those stains. The invention first identifies a set of obviously correct matches, then propagates from those matches, using a priority queue driven process, to optimally match up all fibers in the two sections. The matching is based on the shape and neighborhood configuration of each tissue object.

7 Claims, 3 Drawing Sheets

(51) Int. Cl.
  *G06T 7/33* (2017.01)
  *G06T 7/55* (2017.01)
(52) U.S. Cl.
  CPC .............. *G06T 2207/20221* (2013.01); *G06T 2207/30024* (2013.01)

(56) References Cited

U.S. PATENT DOCUMENTS

2016/0321809 A1* 11/2016 Chukka ................. G16H 30/20
2018/0040120 A1*  2/2018 Faelan ................. G06K 9/0014

OTHER PUBLICATIONS

K. Zampogiannis, C. Fermuller, and Y. Aloimonos, "Topology-aware non-rigid point cloud registration", IEEE Trans. Pattern Anal. Mach. Intell. (early access), 2019.

B. J. Rossetti, F. Wang, P. Zhang, G. Teodoro, D. J. Brat, and J. Kong, "Dynamic registration for gigapixel serial whole slide images", in Proceedings ISBI, 2017, pp. 424-428.

D. F. Gonzalez Obando, A. Frafjord, I. Øynebråten, A. Corthay, J.-C. Olivo-Marin, and V. Meas-Yedid, "Multi-staining registration of large histology images", in Proceedings ISBI, 2017, pp. 345-348.

* cited by examiner

METHOD FOR ALIGNING DIGITAL IMAGES OF TISSUE SECTIONS USING TISSUE OBJECT CORRESPONDENCES

BACKGROUND

Field of the Invention

The present invention relates generally to image analysis methods for the assessment of tissue samples. More specifically, the present invention relates to image analysis methods for the evaluation of multiple biomarkers across multiple tissue sections of the same tissue sample.

Tissue samples are generally preserved, embedded in a block of paraffin, cut into thin sections, and one section placed on a glass slide. This section is typically then further prepared and stained for viewing. Stains can be either chromogenic or fluorescent, which are visible in a brightfield and a fluorescence microscope, respectively. The staining aids in viewing the tissue slide, which otherwise is so thin as to be nearly transparent, but can also be used to tag specific components of the tissue, for example highlighting cells that express a specific protein.

It is difficult to use many different stains on a single slide. There exist some methods that allow the evaluation of multiple biomarkers on the same slide, but workflows are limited to two or three different stains. The limitation comes both from the difficulty of combining the stains without cross-reactivity, and from the difficulty of distinguishing the colors on the slide.

Reducing the number of stains used for an assay makes the assay less expensive, easier to use in the clinic, and more robust. There is a struggle in the industry to reduce the total number of stains in an assay while still increasing the amount of information gathered from the assay.

Description of the Related Art

Tissue preparation and staining is well established in the field, and of common knowledge to one of ordinary skill in the art. Typical methods for tissue staining involve using either chromogenic or fluorescent stains on a single tissue section.

Both brightfield and fluorescent imaging is well understood by one of ordinary skill in the art. It is standard practice to use high-powered fields when using traditional microscopy and whole slide imaging with a digital pathology workflow.

Many methods are proposed in the literature for image alignment or registration, which can be broadly separated into rigid and elastic methods. Rigid registration allows only for a rotation and translation to match one image to the other, whereas elastic registration warps one of the images to match the other. For alignment of whole-slide images of consecutive tissue sections, elastic registration methods are necessary. A rigid registration cannot handle changes in morphology from one section to the next, nor the different stretching, tears and folds that can occur in each of the tissue sections during the mounting process. However, elastic registration is computationally expensive and not precise enough for the use cases covered by the present invention.

As an alternative to aligning two images based on their individual pixels, it is possible to identify specific objects of interest in the two images, and then match up these objects. In the case of muscle fibers, serial sections will show the same set of fibers with very similar local configuration. And there are other tissue objects that also are large enough to show in multiple serial sections. This fiber to fiber matching can then be used to transfer per-fiber information obtained in one image to fibers in the other image, or it can be used to derive an elastic transformation (warping) of one image to match the other.

The fiber to fiber matching can be accomplished with point cloud registration algorithms that have been developed primarily within the robot vision field. However, these algorithms are typically designed for point clouds representing surfaces in three dimensions, and they derive a transformation that matches a surface in one point cloud set to the same surface in a second point cloud set. These algorithms don't typically match up individual points directly. Consequently, the resulting matching is not necessarily optimal.

SUMMARY

In accordance with the embodiments herein, a method for aligning digital images of two tissue sections from the same tissue sample is disclosed. The method described herein generally utilizes digital image analysis of tissue objects within the digital images of the two tissue sections. Generally, each tissue section is processed prior to digitization in such a way to ensure that tissue objects within the section can be properly identified. Once the tissue objects within each digital image have been identified, the image analysis features of the tissue objects are extracted from the digital image. These image analysis features are then used to determine tissue object correspondences between the two digital images, such that tissue objects in the first digital image correspond with tissue objects in the second digital image. These correspondences are then used to align the two digital images.

DETAILED DESCRIPTION OF EMBODIMENTS

In the following description, for purposes of explanation and not limitation, details and descriptions are set forth in order to provide a thorough understanding of the present invention. However, it will be apparent to those skilled in the art that the present invention may be practiced in other embodiments that depart from these details and descriptions without departing from the spirit and scope of the invention.

For purpose of definition, a tissue object is one or more of a cell (e.g., immune cell, muscle fiber), cell sub-compartment (e.g., nucleus, cytoplasm, membrane, organelle), cell neighborhood, a tissue compartment (e.g., tumor, tumor microenvironment (TME), stroma, lymphoid follicle, healthy tissue), blood vessel, a lymphatic vessel, vacuole, collagen, regions of necrosis, extra-cellular matrix, a medical device (e.g., stent, implant), a gel, a parasitic body (e.g., virus, bacterium), a nanoparticle, a polymer, and/or a non-dyed object (e.g., metal particle, carbon particle). Tissue objects are visualized by histologic stains which highlight the presence and localization of a tissue object. Tissue objects can be identified directly by stains specifically applied to highlight the presence of said tissue object (e.g., hematoxylin to visualize nuclei, IHC stain for a protein specifically found in a muscle fiber membrane), indirectly by stains applied which non-specifically highlight the tissue compartment (e.g., eosin staining), are biomarkers known to be localized to a specific tissue compartment (e.g., nuclear-expressed protein, carbohydrates only found in the cell membrane), or can be visualized without staining (e.g., carbon residue in lung tissue).

For the purpose of this disclosure, patient status includes diagnosis of inflammatory status, disease state, disease severity, disease progression, therapy efficacy, and changes in patient status over time. Other patient statuses are contemplated.

Figure 1:
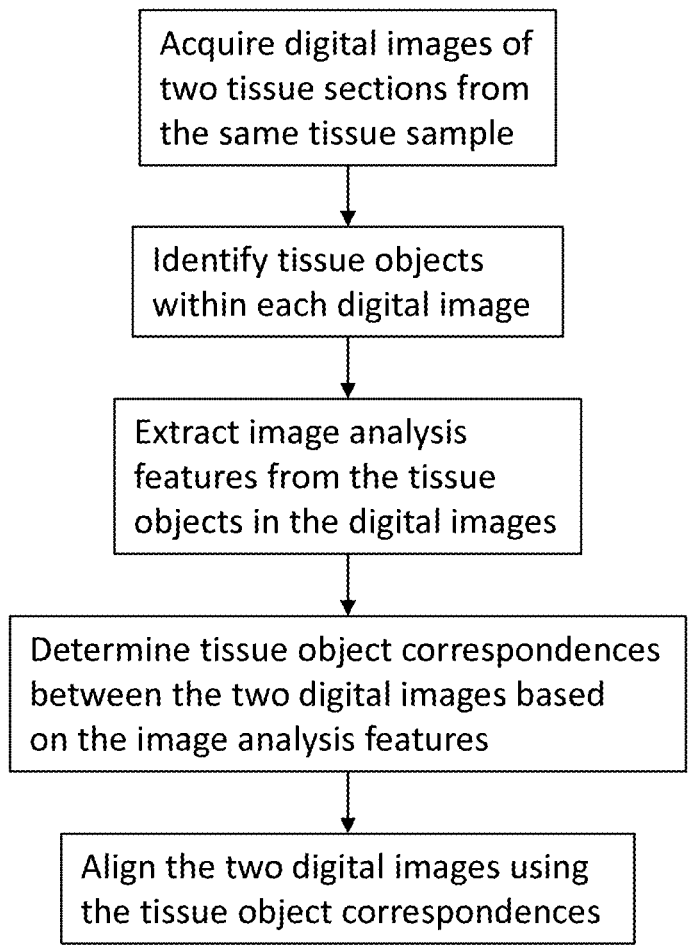
FIG. 1 provides a general overview of the method described herein.

In an illustrative embodiment of the invention, as summarized in FIG. 1, the method may be summarized in the following four steps: i) acquiring digital images of two tissue sections from a tissue sample from a patient, where the tissue sections are processed to allow for identification of tissue objects within the samples; ii) identifying tissue objects within both digital images; iii) extracting image analysis features from the tissue objects, such that the same image analysis feature is extracted from the tissue objects; and iv) aligning the first and second image using tissue object correspondences, where the tissue object correspondences are determined based on the similarity of the image analysis features between the tissue objects in the first digital image and the second digital image. Typically, the tissue sections are stained with a number of stains to ensure that the tissue objects within the sample are easily distinguished. However, it is understood that staining the sample is not required for the method to function.

Figure 2:
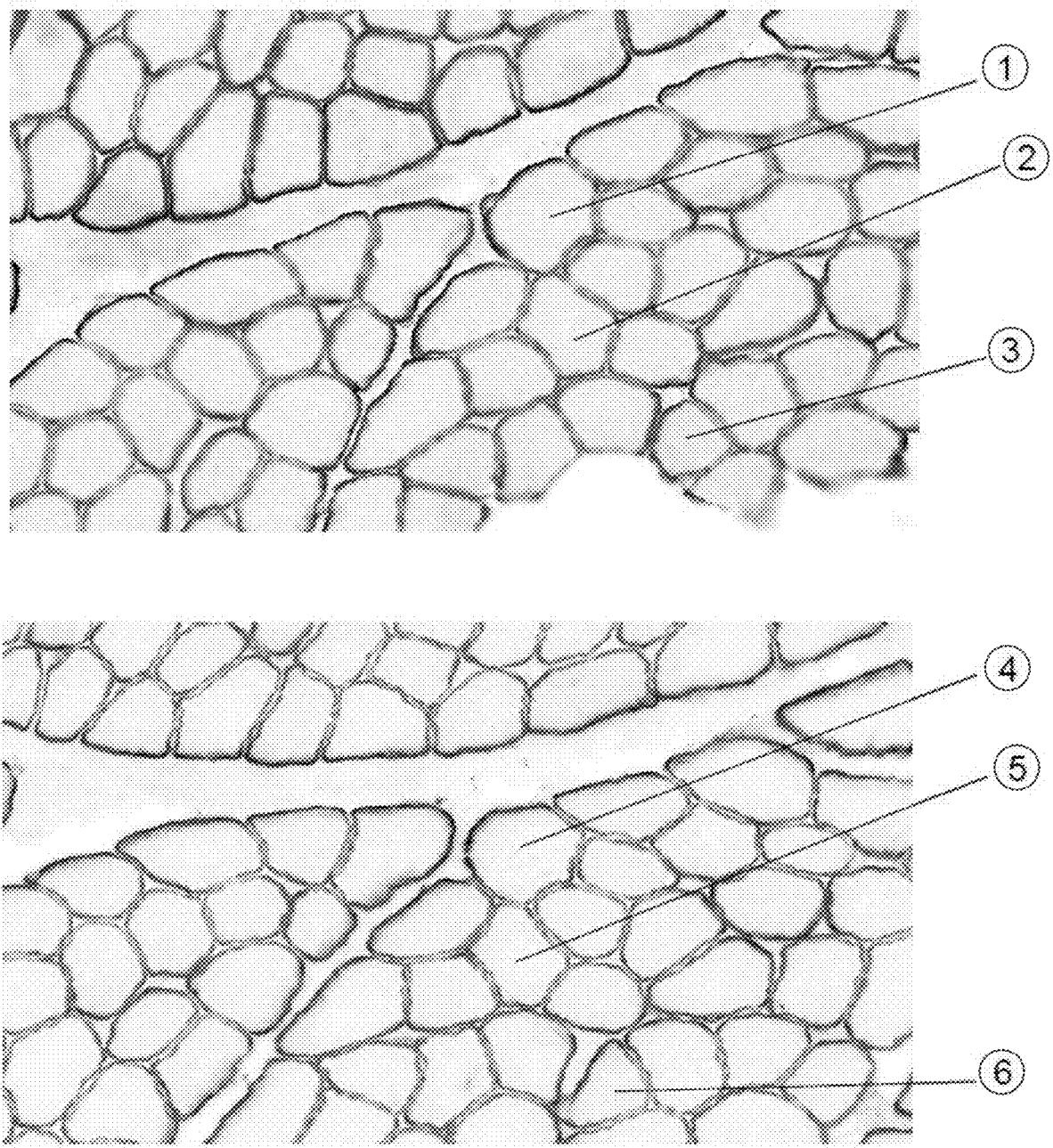
FIG. 2 shows two muscle sections where the muscle fibers can be identified as perfect matches between the two sections.

In a further embodiment shown in FIG. 2, the tissue sample could be a sample of muscle tissue. The tissue objects in the tissue sections could be muscle fibers. Typically, muscle fibers are long enough to be seen across multiple tissue sections taken from the same sample. This is distinct from other cell types. Sections that are not muscle typically have very few cells that are the same cells between multiple sections, even with consecutive sections.

In another embodiment, the image analysis features include morphometric features, localization features, neighborhood features, and staining features of the tissue objects within the tissue sample. Morphometric features are features related to the size, shape, area, texture, organization, and organizational relationship of tissue objects observed in a digital image. For example, and not limitation, morphometric features could be the area of a cell nucleus, the completeness of biomarker staining in a cell membrane, the diameter of a cell nucleus, the roundness of a blood vessel, lacunarity of biomarker staining in a nucleus, etc.

Localization features are features related to position of a feature in the tissue section, spatial relationships of tissue objects relative to each other, relationship of image analysis features between tissue objects in the tissue section, and distribution of image analysis features within a tissue object. Location can be determined based on an absolute (e.g., x and y location based on pixel dimensions of image, μm from center of image defined by pixel dimensions of image) or relative (e.g., x and y position of cells relative to a tissue feature of interest such as a vessel, polar coordinates referenced to the center of mass of a tumor nest) coordinate system (e.g., x-y-z coordinates, polar coordinates). Location for specific image objects can be defined as the centroid of the object or any position enclosed by the object extending from the centroid to the exterior limits of the object.

Neighborhood features are features related to tissue object morphology within a distance of an anchor tissue object, tissue object staining within a distance of an anchor tissue object, and morphology and/or staining between tissue objects within a distance of an anchor tissue object. For example, and not limitation, neighborhood features could be the average size or area of cells within 100 microns of an anchor cell or the quality or quantity of staining of cell nuclei within 500 microns of an anchor cell nucleus.

Staining features are features related to stain appearance, stain intensity, stain completeness, stain shape, stain texture, stain area, and stain distribution of specified immunohistochemistry, in situ hybridization, and immunofluorescence stains or dyes or amount of a molecule determined by mass spectroscopy based imaging methodologies. Staining features are evaluated relative to tissue objects (e.g., average staining intensity in each cell in an image, staining level in a cell membrane, biomolecule expression in a nucleus).

In an additional embodiment, the tissue object correspondences can be determined using tissue object morphology, such as morphometric features, or using spatial relations between neighboring tissue objects, such as localization and neighborhood features. When determining what are neighboring tissue objects, a number of different methods can be used. Physical proximity using a Delaunay triangulation, a maximum fixed distance, or a maximum number of nearest objects can be used to determine if a tissue object is a neighboring tissue object to an object of interest.

In a further embodiment, the tissue sections may be stained for biomarkers. If the tissue sections are stained for a biomarker, the biomarker can be quantified for each tissue object. This biomarker quantification data would be specific to the digital image that contains the tissue object of interest. The biomarker quantification data from the two digital images can be combined using the tissue object correspondences, or even once the digital images are aligned. This can lead to a version of multiplexing, where each tissue section is stained in such a way to highlight a different biomarker, yet both the biomarker information from each tissue section is easily interpreted into the other tissue section.

With the combined biomarker quantification data, a patient status for the patient from whom the tissue sample was taken can be determined. Patient status includes diagnosis of disease state, disease severity, disease progression, and therapy efficacy. Other patient statuses are contemplated.

Unlike the current state of the art, where tissue alignment is largely restricted to consecutive sections, a further embodiment of the present invention can be used to align consecutive serial sections, non-consecutive serial sections, and even non-serial sections. The present method provides for ample correction of error, both systemic and human error, as consecutive serial sections are not always available for analysis. The present invention provides for a way to correct that issue.

Figure 3:
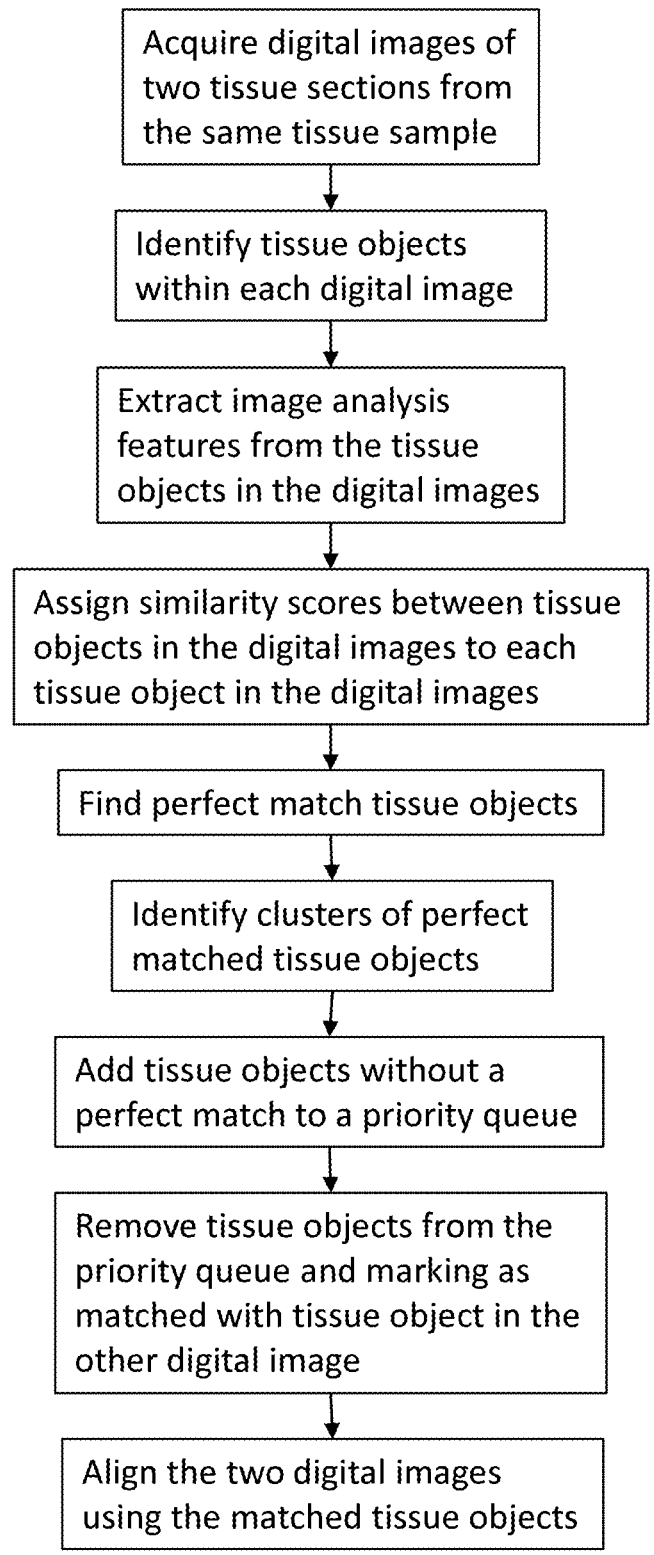
FIG. 3 provides an overview of an embodiment of the method described herein.

In another embodiment, as shown in FIG. 3, the method may comprise the following additional five steps: i) assigning a first similarity score between each tissue object in the first digital image and a plurality of tissue objects in the second digital image, and a second similarity score between each tissue object in the second digital image and a plurality of tissue objects in the first digital image; ii) finding the set of perfect matches for each tissue object in the first digital image with the tissue objects in the second digital image, such that a perfect match is two tissue objects that have the best similarity score one and similarity score two with each other; iii) identifying clusters of perfect matches using neighborhood features where the tissue objects in the cluster in the first digital image have a similar spatial arrangement to the matching tissue objects in the cluster in the second digital image, and discarding the perfect matches that are not in a cluster; iv) adding each tissue object without a perfect match in the first digital image that has a neighboring matched tissue object, along with the tissue object in the second digital image that is the most likely match, to a priority queue, where the tissue objects in the priority queue are ordered based on their similarity scores to their most likely match and where a matched tissue object is a tissue object with a perfect match or one matched via the priority queue; and v) extracting tissue objects from the top of the priority queue, marking that tissue object as matched if matching requirements are met, and enqueuing its unmatched neighbors until all the tissue objects have been considered.

Similarity scores can be calculated using analysis of the image analysis features of the two tissue objects that may be matched, analysis of the relative spatial location of the two tissue objects that may be matched within their respective tissue sections, a combination of these methods, or other methods. A most likely matching tissue object may be one that is spatially closest to the same location as the tissue object of interest based on the neighboring matches or one that has the best similarity score in a small region around that point. This small region would typically be no more than 200 μm across, though could be enlarged to accommodate larger tissue deformations incurred for example by tears. The combination of these measures may be used as well to determine the most likely matching tissue object. Other methods are contemplated to determine a most likely matching tissue object.

Matching requirements are typically based on spatial ordering of the new match and previously matched neighboring tissue objects, a preset minimum similarity score, a maximum local spatial displacement, or some combination of these factors.

FIG. 2 shows an application of this embodiment. The figure shows two sections of muscle tissue, with similar but subtly different morphology. Fibers 1 and 4 can easily be recognized as being the same fiber, as can 2 and 5. Their shapes are irregular and distinct, and match across sections, and thus were identified as perfect matches this method. 3 and 6 are also the same fiber, but the shapes do not match. This pair was put into the priority queue and assigned after all the neighbors had been matched.

What is claimed is:

1. A method comprising:
   acquiring a digital image of a first tissue section from a tissue sample from a patient, creating a first image, wherein the first tissue section is processed in such a way to allow for identification of at least one tissue object within the first image;
   acquiring a digital image of a second tissue section from the tissue sample from the patient, creating a second image, wherein the second tissue section is processed in such a way to allow for identification of at least one tissue object within the second image;
   identifying at least one first tissue object in the first image and at least one second tissue object in the second image;
   extracting at least one image analysis feature from the at least one first tissue object;
   extracting the at least one image analysis feature from the at least one second tissue object; and
   aligning the first image with the second image using tissue object correspondences, wherein the tissue object correspondences are determined based on comparisons of the at least one image analysis feature extracted between tissue objects in the first digital image and tissue objects in the second digital image; and
   wherein the tissue object correspondences are determined using spatial relations between neighboring tissue objects and neighboring tissue objects are defined by physical proximity using a Delaunay triangulation, a maximum distance, or a maximum number of nearest neighbors.

2. A method comprising:
   acquiring a digital image of a first tissue section from a tissue sample from a patient, creating a first image, wherein the first tissue section is processed in such a way to allow for identification of at least one tissue object within the first image;
   acquiring a digital image of a second tissue section from the tissue sample from the patient, creating a second image, wherein the second tissue section is processed in such a way to allow for identification of at least one tissue object within the second image, wherein at least one of the first tissue section and second tissue section is stained for a biomarker;
   identifying at least one first tissue object in the first image and at least one second tissue object in the second image;
   extracting at least one image analysis feature from the at least one first tissue object;
   extracting the at least one image analysis feature from the at least one second tissue object; and
   aligning the first image with the second image using tissue object correspondences, wherein the tissue object correspondences are determined based on comparisons of the at least one image analysis feature extracted between tissue objects in the first digital image and tissue objects in the second digital image;
   quantifying the biomarker within each tissue object for each section that contains biomarker staining to generate biomarker quantification data for each digital image; and
   combining the biomarker quantification data of the first digital image and the biomarker quantification data of the second digital image using the tissue object correspondence.

3. The method of claim 2, further comprising determining at least one patient status for the patient based on the combined biomarker quantification data, wherein the at least one patient status is selected from the group consisting of diagnosis, disease severity, disease progression, and therapy efficacy.

4. A method comprising:
   acquiring a digital image of a first tissue section from a tissue sample from a patient, creating a first image, wherein the first tissue section is processed in such a way to allow for identification of at least one tissue object within the first image;
   acquiring a digital image of a second tissue section from the tissue sample from the patient, creating a second image, wherein the second tissue section is processed in such a way to allow for identification of at least one tissue object within the second image;
   identifying at least one first tissue object in the first image and at least one second tissue object in the second image;
   extracting at least one image analysis feature from the at least one first tissue object;
   extracting the at least one image analysis feature from the at least one second tissue object; and aligning the first image with the second image using tissue object correspondences, wherein the tissue object correspondences are determined based on comparisons of the at least one image analysis feature extracted between tissue objects in the first digital image and tissue objects in the second digital image;

wherein the aligning step further comprises:

assigning a first similarity score between each tissue object in the first digital image and a plurality of tissue objects in the second digital image, and a second similarity score between each tissue object in the second digital image and a plurality of tissue objects in the first digital image;

finding a set of perfect matches of each of the tissue objects in the first digital image with at least one of the tissue objects in the second digital image, such that a perfect match is two tissue objects that have the best first similarity score and second similarity score with each other; and identifying clusters of perfect matches using neighborhood features where the tissue objects in the cluster in the first digital image have a similar spatial arrangement to the matching tissue objects in the cluster in the second digital image, and discarding the perfect matches that are not in a cluster;

adding each tissue object without a perfect match in the first digital image that has a neighboring matched tissue object, along with the tissue object in the second digital image that is the most likely match, to a priority queue, wherein the tissue objects in the priority queue are ordered based on their similarity scores to their most likely match and wherein a matched tissue object is a tissue object with a perfect match or one matched via the priority queue; and extracting tissue objects from the top of the priority queue, marking that tissue object as matched if matching requirements are met, and enqueuing its unmatched neighbors until all the tissue objects have been considered.

5. The method of claim 4, wherein the similarity score between two tissue objects is computed using a methodology selected from the group consisting of analysis of the image analysis features associated to the two tissue objects, analysis of the relative spatial location of the two objects within their respective tissue sections, and a combination of the two.

6. The method of claim 4, wherein the most likely matching tissue object is selected from the group consisting of the one that is spatially closest to a location computed using the neighboring matches, has the best similarity score in a small region around that point, and a combination of those two measures.

7. The method of claim 4, wherein the matching requirements are selected from the group consisting of spatial ordering of a new match and previously matched neighboring tissue objects, a minimum similarity score, a maximum local displacement, and any combination of the group.

* * * * *